(12) United States Patent
Fang

(10) Patent No.: US 9,544,295 B2
(45) Date of Patent: Jan. 10, 2017

(54) LOGIN METHOD FOR CLIENT APPLICATION AND CORRESPONDING SERVER

(71) Applicant: Alibaba Group Holding Limited, Grand Cayman (KY)

(72) Inventor: Tengfei Fang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 1 day.

(21) Appl. No.: 14/512,723

(22) Filed: Oct. 13, 2014

(65) Prior Publication Data
US 2015/0106905 A1  Apr. 16, 2015

(30) Foreign Application Priority Data
Oct. 14, 2013  (CN) .......................... 2013 1 0478657

(51) Int. Cl.
*H04L 29/06* (2006.01)
*G06F 21/41* (2013.01)

(52) U.S. Cl.
CPC ........... *H04L 63/0815* (2013.01); *G06F 21/41* (2013.01); *H04L 63/083* (2013.01); *H04L 63/0807* (2013.01)

(58) Field of Classification Search
None
See application file for complete search history.

(56) References Cited

U.S. PATENT DOCUMENTS 8,613,070 B1 * 12/2013 Borzycki ............ G06F 21/6218
726/8
9,065,819 B1 * 6/2015 Shanmugam ....... H04L 63/0815
(Continued)

OTHER PUBLICATIONS

PCT Search Report and Written Opinion mailed Jan. 29, 2015 for PCT Application No. PCT/US14/60248, 10 Pages.
(Continued)

*Primary Examiner* — Christopher Revak
(74) *Attorney, Agent, or Firm* — Lee & Hayes, PLLC

(57) ABSTRACT

The present disclosure provides a login method for a client application and a corresponding server. The method includes: sending an access token to a browser of a terminal and creating a corresponding relationship between the access token and user information of a user after the user has successfully logged into a web application via the browser of the terminal; receiving a relationship creating request from the browser and creating a corresponding relationship between device information of the terminal and the access token in accordance with the relationship creating request, wherein the relationship creating request includes the device information of the terminal and the access token; receiving a login request of a client application, the login request including the device information of the terminal that operates the client application; determining the access token corresponding to the device information of the terminal that operates the client application based on the created corresponding relationship between the device information and the access token; and determining the user information which corresponds to the access token based on the created corresponding relationship between the access token and the user information, and performing a login operation of the client application program based on the user information. The technical scheme of the present disclosure can achieve login without re-inputting information such as a user name and a password when a client application is to be logged in after a web application in a terminal has successfully been logged in.

20 Claims, 5 Drawing Sheets

(56) References Cited

U.S. PATENT DOCUMENTS

| | | | |
|---|---|---|---|
| 9,270,567 B2* | 2/2016 | Kong | H04L 63/0281 |
| 2003/0200465 A1 | 10/2003 | Bhat et al. | |
| 2004/0250118 A1 | 12/2004 | Andreev et al. | |
| 2005/0108551 A1 | 5/2005 | Toomey | |
| 2006/0075224 A1 | 4/2006 | Tao | |
| 2008/0092215 A1 | 4/2008 | Soukup et al. | |
| 2008/0201731 A1* | 8/2008 | Howcroft | H04H 60/46 |
| | | | 725/13 |
| 2009/0205032 A1* | 8/2009 | Hinton | H04W 12/06 |
| | | | 726/7 |
| 2010/0146611 A1 | 6/2010 | Kuzin et al. | |
| 2012/0023565 A1 | 1/2012 | Tumanyan | |
| 2012/0054625 A1 | 3/2012 | Pugh et al. | |
| 2012/0151568 A1 | 6/2012 | Pieczul et al. | |
| 2012/0291114 A1* | 11/2012 | Poliashenko | G06F 21/41 |
| | | | 726/8 |
| 2012/0311330 A1 | 12/2012 | Zhang et al. | |
| 2013/0086669 A1 | 4/2013 | Sondhi et al. | |
| 2013/0139241 A1 | 5/2013 | Leeder | |
| 2013/0290719 A1* | 10/2013 | Kaler | H04L 63/0435 |
| | | | 713/168 |
| 2013/0305338 A1* | 11/2013 | Casals Andreu | H04L 63/0815 |
| | | | 726/8 |
| 2014/0082715 A1* | 3/2014 | Grajek | G06F 17/30876 |
| | | | 726/8 |
| 2014/0189781 A1* | 7/2014 | Manickam | H04L 67/34 |
| | | | 726/1 |
| 2014/0208407 A1* | 7/2014 | VanBlon | G06F 21/41 |
| | | | 726/8 |
| 2014/0282983 A1 | 9/2014 | Ju et al. | |
| 2014/0310792 A1* | 10/2014 | Hyland | H04L 63/0861 |
| | | | 726/8 |
| 2015/0089620 A1* | 3/2015 | Manza | H04L 63/0838 |
| | | | 726/8 |
| 2015/0121501 A1* | 4/2015 | Khalid | H04L 63/0815 |
| | | | 726/8 |
| 2015/0188907 A1* | 7/2015 | Khalid | H04L 63/0815 |
| | | | 726/8 |
| 2016/0255078 A1* | 9/2016 | Zhang | H04L 63/18 |

OTHER PUBLICATIONS

Tham, et al., "Ubiquitous Authorization Scheme Based on Device Profile", retrieved on Jan. 15, 2015 at <<http://rd.springer.com/chapter/10.1007%2F11807964_32#page-1>>, EUC Workshops 2006, LNCS 4097, 2006, pp. 312-321.

* cited by examiner

LOGIN METHOD FOR CLIENT APPLICATION AND CORRESPONDING SERVER

CROSS REFERENCE TO RELATED PATENT APPLICATION

This application claims foreign priority to Chinese Patent Application No. 201310478657.4 filed on Oct. 14, 2013, entitled "Login Method for Client Application and Corresponding Server", which is hereby incorporated by reference in its entirety.

TECHNICAL FIELD

The present disclosure is related to the field of Internet technology, and more particularly to a login method for a client application and a corresponding server.

BACKGROUND

With the rapid development of mobile Internet technology, smart terminals have become more popular and have drawn increasing attention from users. Various application programs are developed for the smart terminals. Whether for a client application program (i.e., App) or a web page application program (i.e., web App), a user is usually required to perform a login.

Currently, a single sign-on scheme across multiple web page applications has been implemented. The principle for achieving the scheme is as follows: a user visits a website A and performs a login operation; after the login is successful, a server of the website A writes a cookie, which is called a "token", to the user's browser to indicate that the user has already logged in, and stores the user's information in a cache of the server, where a key for the cache is the token and the value is the user's information; when the user visits a website B, the browser first visits a certain URL of the website A (this URL will automatically jump to the website B) and sends the cookie to the website B as an http parameter; and the website B verifies the validity of the token, searches for the user's information in the server using the token, performs a login, and deletes cache information corresponding to the token.

Although the above existing technology can achieve a single sign on across multiple websites, this technology is unable to achieve a single sign on between a client application on a mobile terminal and a website because the browser is unable to send the cookie directly to an application program.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

An objective of the present disclosure is to provide a login method for a client application and a corresponding server, in order to solve the problem of inability of achieving a single sign on across a web application program and a client application program on a terminal.

The present disclosure provides a login method for a client application, which includes: sending an access token to a browser of a terminal and creating a corresponding relationship between the access token and user information of a user after the user has successfully logged into a web application via the browser of the terminal; receiving a relationship creating request from the browser and creating a corresponding relationship between device information of the terminal and the access token in accordance with the relationship creating request, wherein the relationship creating request includes the device information of the terminal and the access token; receiving a login request of a client application, the login request including the device information of the terminal that operates the client application; determining the access token corresponding to the device information of the terminal that operates the client application based on the created corresponding relationship between the device information and the access token; and determining the user information which corresponds to the access token based on the created corresponding relationship between the access token and the user information, and performing a login operation of the client application program based on the user information.

According to an embodiment of the present disclosure, the method further comprises: obtaining a current IP address, a device type and an operating system type of the terminal after the user has successfully logged into the web application via the browser of the terminal.

According to an embodiment of the present disclosure, the method further comprises: receiving the device type and the operation system type of the terminal from the client application and obtaining the current IP address of the terminal; querying whether a terminal that is consistent with the device type and the operation system type of the terminal and matches the IP address of the terminal has successfully logged into a web application related to the client application within a predetermined period of time; and if not, notifying the client application to log in using a user name and a password.

According to an embodiment of the present disclosure, the method further comprises: sending an identification token to the browser after the corresponding relationship between the device information of the terminal and the access token is created in accordance with the relationship creating request.

According to an embodiment of the present disclosure, the login request further includes the identification token.

According to an embodiment of the present disclosure, the method further comprises: determining whether the identification token included in the received login request is valid after receiving the login request of the client application; and rejecting the login request of the client application upon determining that the identification token is invalid.

According to an embodiment of the present disclosure, the method includes deleting the corresponding relationship between the device information of the terminal and the access token after the client application is successfully logged in.

According to an embodiment of the present disclosure, the device information comprises any one of the following: a unique identifier of the device or a physical address of the device.

According to another aspect of the present disclosure, a server implementing a login method for a client application is provided, which comprises: a sending module used for sending an access token to a browser of a terminal when a user has successfully logged into a web application via the browser of the terminal; a first creation module used for creating a corresponding relationship between the access token and user information of the user; a first receiving module used for receiving a relationship creating request from the browser, wherein the relationship creating request includes device information of the terminal and the access token; a second creation module used for creating a corresponding relationship between the device information of the terminal and the access token in accordance with the creating relationship request; a second receiving module used for receiving a login request of a client application, wherein the login request includes the device information of the terminal that operates the client application; a first determination module used for determining the access token corresponding to the device information of the terminal that operates the client application based on the created corresponding relationship between the device information and the access token; a second determination module used for determining the user information corresponding to the access token based on the created corresponding relationship between the access token and the user information; and a login module used for obtaining the corresponding user information based on the device information of the terminal included in the login request, and performing a login operation of the client application based on the user information.

According to an embodiment of the present disclosure, the server further comprises: an acquisition module used for obtaining a current IP address, a device type and an operating system type of the terminal after the user has successfully logged into the web application program via the browser of the terminal.

According to an embodiment of the present disclosure, the server further comprises: a third receiving module used for receiving the device type and the operation system type of the terminal from the client application; an IP address acquisition module used for obtaining the current IP address of the terminal; a query module used for querying whether a terminal that matches the device type, the operation system type and the IP address of the terminal has successfully logged into a web application program related to the client application within a predetermined period of time; and a notification module used for notifying the client application to log in with a user name and a password when no terminal that matches the device type, the operation system type and the IP address of the terminal has successfully logged into the web application program related to the client application within the predetermined period of time.

According to an embodiment of the present disclosure, the server further comprises: an identification token sending module used for sending an identification token to the browser after the corresponding relationship between the device information of the terminal and the access token is created in accordance with the relationship creating request.

According to an embodiment of the present disclosure, the login request further includes the identification token.

According to an embodiment of the present disclosure, the server further comprises: a determination module used for determining whether the identification token included in the received login request is valid; and a request rejection module used for rejecting the login request from the client application upon determining that the identification token is invalid.

According to an embodiment of the present disclosure, the server further comprise a deletion module used for deleting the corresponding relationship between the device information of the terminal and the access token after the client application is successfully logged in.

According to an embodiment of the present disclosure, the device information comprises any one of the following: a unique identifier of the device or a physical address of the device.

According to another aspect of the present disclosure, a login method for a client application in a terminal is provided, which comprises: receiving an access token returned from a server when a browser is used to log into an application service provided by a web application of the server, and storing the access token in the terminal, wherein the access token corresponds to user information for logging into the web application; obtaining device information of the terminal when the client application in the terminal that is related to the web application program is used to log into the application service; calling the browser and sending the device information of the terminal and the access token through the browser to request the server to create a corresponding relationship between the device information of the terminal and the access token; initiating a login request using the client application, wherein the login request includes the device information of the terminal, and the login request is used for requesting the server to determine the access token which corresponds to the device information of the terminal based on the created corresponding relationship between the device information of the terminal and the access token; and determining the user information corresponding to the access token based on the corresponding relationship between the access token and the user information, and performing a login operation using the determined user information.

According to an embodiment of the present disclosure, the method further comprises: sending a device type and an operation system type of the terminal to the server to allow the server to determine whether the client application is permitted to send a relationship creating request to the server; and receiving notification from the server indicating whether the client application is permitted to send the relationship creating request to the server.

According to an embodiment of the present disclosure, the method further comprises: obtaining an identification token that is sent by the server from the browser, wherein the identification token is sent to the browser of the terminal from the server when the relationship creating request is received.

According to an embodiment of the present disclosure, the login request that is sent to the server further includes the identification token.

According to an embodiment of the present disclosure, the device information comprises any one of the following: a unique identifier of the device or a physical address of the device.

As compared to the existing technology, after a web application program in a terminal is successfully logged in, the technical scheme of the present disclosure is able to achieve a single sign on (i.e. without the necessity of inputting information such as a user account and a password again) of a client application in the terminal that is used by a user based on a single sign on URL sent by the client application for performing a login operation of the client application, thus improving the user experience of the client application.

BRIEF DESCRIPTION OF THE DRAWINGS

The drawings described herein are used to provide a further understanding of the present disclosure, and are constituted as parts of the present disclosure. The exemplary embodiments and descriptions thereof are used for explaining the present disclosure and should not be construed as inappropriate limitations to the present disclosure. In the drawings.

DETAILED DESCRIPTION

One of the main concepts of the present disclosure is that: after a user has successfully logged into a certain web application through a browser in a terminal, a corresponding relationship between user information and an access token and a corresponding relationship between device information and the access token are established. When the user performs login via a client application, he/she can directly log in using the device information of the terminal sent from the browser without the need of inputting cumbersome verification information.

In order to make the objectives, the technical solutions and the advantages of the present disclosure more clear, the technical solutions of the present disclosure will be described in conjunction with the embodiments and the accompanying drawings in a clear and comprehensive manner. Apparently, the embodiments described herein are only parts but not all of the embodiments. Based on the embodiments of the present disclosure, one skilled in the art can obtain all the other embodiments without creative effort, which are also included in the scope of the present disclosure.

To facilitate the description of the following text, an explanation of terminology involved in the various implementations of the present disclosure is first introduced.

A terminal refers to a device used by a user to communicate with a server in a network system. A terminal in the present disclosure may include, but is not limited to, a device such as a mobile phone, a tablet, a notebook computer, etc.

A client application refers to a third-party program which is installed in a terminal for providing service to a user and which is in correspondence with a server, e.g., an application program installed in a smart phone terminal. The client application may communicate with the service and provide service to a user. The service or part of the service provided by the client application is operated based on a local operation system.

A web application (web app) refers to a web-based application, i.e. an application program that can be accessed through a webpage, for example, a website. The web application is coded in an environment supported by a browser or using a programming language supported by the browser (e.g. JavaScript), and is operated based on the browser.

According to an embodiment of the present disclosure, a login method for a client end application program is provided.

Figure 1:
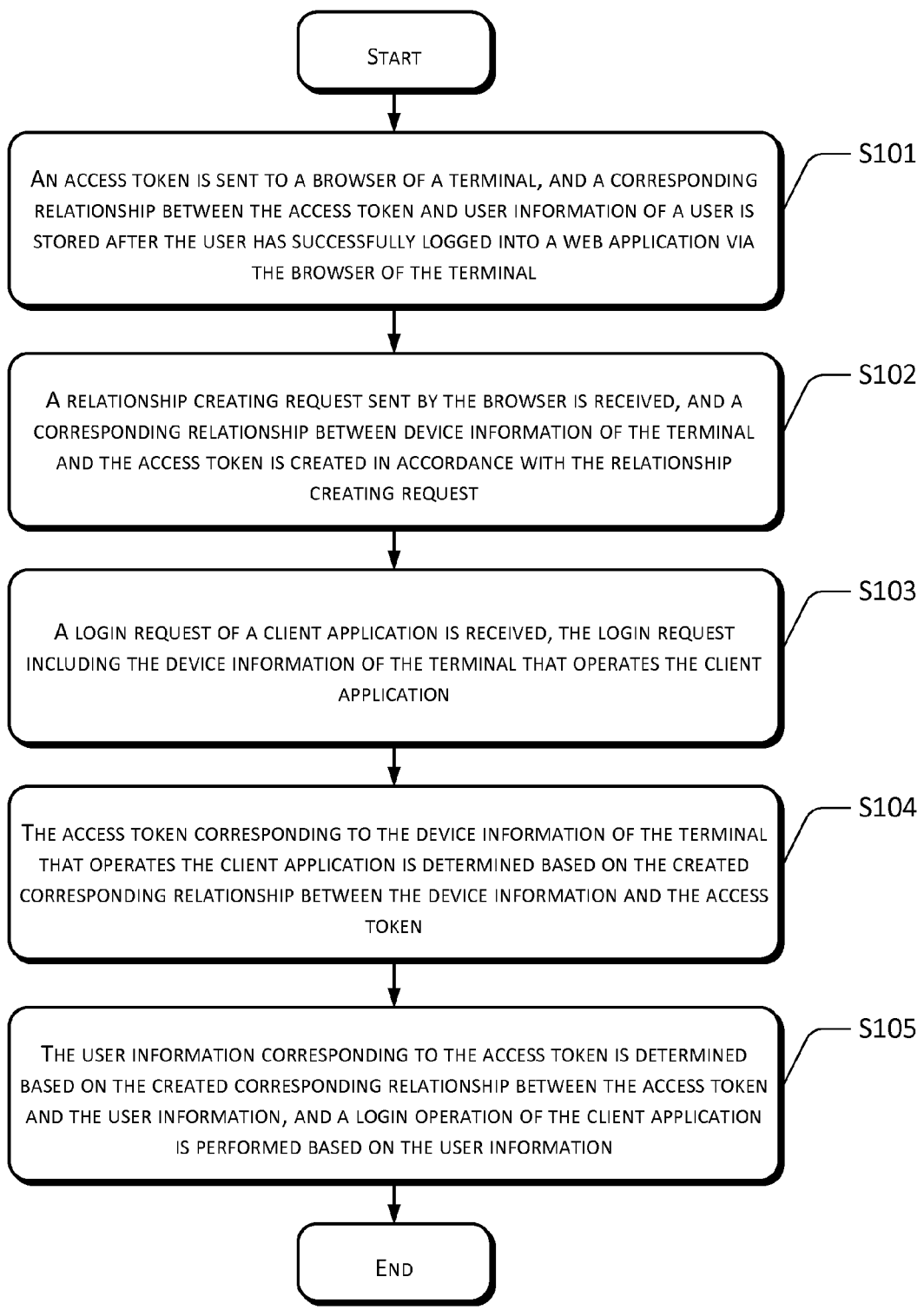
FIG. 1 is a flowchart illustrating a login method for a client application according to the present disclosure.

As referring to FIG. 1, FIG. 1 is a flowchart illustrating a login method for a client application (app) according to an embodiment of the present disclosure.

As shown in FIG. 1, at S101, an access token is sent to a browser of a terminal, and a corresponding relationship between the access token and user information of a user is stored after the user has successfully logged into a web application via the browser of the terminal.

Generally, a cookie is generated at the server end and is sent to a browser of a terminal when a website is accessed by a user through the browser of the terminal. Therefore, an access token may be generated randomly after a user has successfully logged into a webpage via a browser of a terminal, and can be placed within a cookie that is generated by a server for sending to the browser. Further, a corresponding relationship between the access token and user information of the user can be created.

At S102, a relationship creating request sent by the browser is received, and a corresponding relationship between device information of the terminal and the access token is created in accordance with the relationship creating request, wherein the relationship creating request includes the device information of the terminal and the access token. The device information comprises any one of the following: a unique identifier of the device or a physical address of the device. In other words, the client application wakes up the browser so that the browser sends a relationship creating request that includes device information of the terminal and the access token to the server. It should be understood that the device information of the terminal can be a physical address, i.e. MAC address, of the terminal.

The terminal stores the access token. The access token is stored in a form of a cookie. The client application cannot directly invoke the access token. However, the browser is able to obtain the access token that is stored in a form of the cookie in the terminal.

The client application in the terminal can be a client application related to the web application, for example, a microblog web application (e.g., logged into Weibo via a webpage) and a microblog application installed in the terminal, a web payment application (which is logged into a payment website for making payment on a webpage) and a payment application installed in the terminal. User information of the user in the web application program can be the same as user information in the client application, such as having a same account or a same login password. The client application of the terminal may obtain the device information of the terminal. Hence, the client application may send the obtained device information of the terminal and the access token included in the cookie that is obtained by the browser to the server via the browser, in order to request the server to create a corresponding relationship between the device information of the terminal and the access token.

Specifically, a user may log into a certain web application successfully via a browser of a terminal. The browser may store an access token that is returned by a server. When the user intends to log into a certain client application related to the web application program, the browser of the terminal can be invoked so that device information of the terminal and an access token can be sent to the server in a form of a http request parameter by the browser to request the server to create a corresponding relationship between the device information and the access token. After receiving the relationship creating request, the server may create a corresponding relationship between the device information of the terminal and the access token in accordance with the relationship creating request.

At S103, a login request of a client application is received. The login request includes the device information of the terminal that operates the client application. The device information comprises any one of the following: a unique identifier of the device or a physical address of the device. The already logged user information of the terminal is found in the server using the device information.

At S104, the access token corresponding to the device information of the terminal that operates the client application is determined based on the created corresponding relationship between the device information and the access token. The corresponding relationship between the device information and the access token is created at S102 as described above. Therefore, the access token corresponding to the device information of the terminal can be determined based on the created corresponding relationship.

At S105, the user information corresponding to the access token is determined based on the created corresponding relationship between the access token and the user information, and a login operation of the client application is performed based on the user information. Once the access token corresponding to the device information is obtained, the user information corresponding to the access token can be obtained thereafter based on the corresponding relationship between the access token and the user information of the user created at S101, so as to determine the user information corresponding to the device information of the terminal, and the login operation of the client application can be performed based on the user information.

Figure 2:
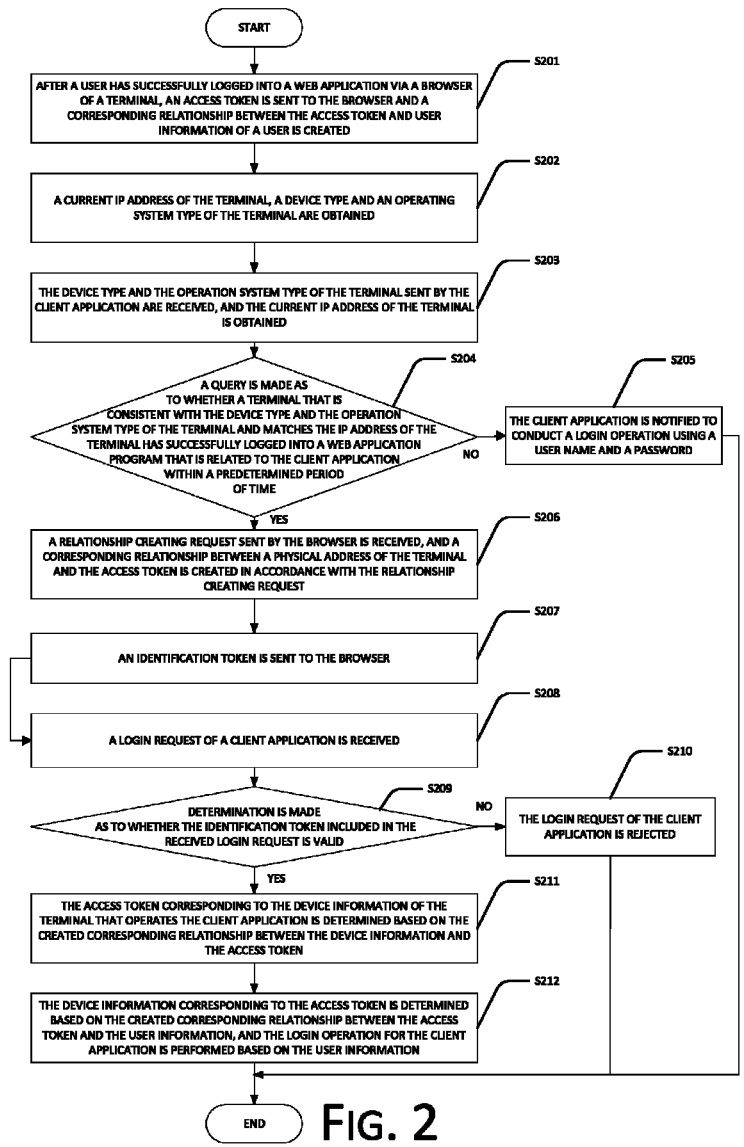
FIG. 2 is a flowchart illustrating a login method for a client application according to another embodiment of the present disclosure.

FIG. 2 is a flowchart illustrating another embodiment of the present disclosure.

As shown in FIG. 2, at S201, after a user has successfully logged into a web application via a browser of a terminal, an access token is sent to the browser and a corresponding relationship between the access token and user information of a user is created.

At S202, a current IP address of the terminal, a device type and an operating system type of the terminal are obtained.

In order to ensure the security of login, after a user has successfully logged into a web application, a current IP address of the terminal can be obtained, and a device type (such as resolving whether the terminal is a mobile terminal or other type of terminal) and an operation system type (i.e. the type of operation system to which the terminal belongs) are resolved. According to the http transmission protocol, a browser typically sends user agent information when visiting a webpage. Under normal circumstances, the user agent information includes information of an operation system that runs the browser, i.e. type information of the operating system of the terminal. Therefore, the device type and the operation system type can be resolved from the user agent information that is included in the http request.

At S203, the device type and the operation system type of the terminal sent by the client application are received, and the current IP address of the terminal is obtained.

At S204, a query is made as to whether a terminal that is consistent with the device type and the operation system type of the terminal and matches the IP address of the terminal has successfully logged into a web application program that is related to the client application within a predetermined period of time. The predetermined period of time refers to a predetermined length of time before the current time.

Specifically, when the client application needs to log in, the client application may first send the device type and the operation system type of the terminal to the server. Since the current IP address of the terminal and the device type and the operation system type of the terminal have been obtained after the user successfully logs into a web page using the browser, the server can obtain the current IP address of the terminal when receiving the device type and the operation system type of the terminal from the client application. Based on the device type and the operation system type of the terminal and the obtained current IP address of the terminal, the server may determine whether a terminal that is consistent with the device type and the operation system type of the terminal has successfully logged in a web application related to the client application, with a IP address thereof being the same as the IP address of the terminal or corresponding to a same area as the IP address of the terminal within a predetermined period of time (which is a predetermined length of time prior to the current time and may be set up according to special situations, e.g., configured to be within one minute earlier than the current time). In other words, determination is made as to whether a terminal that matches the device type, the operation system type and IP address of the terminal has successfully logged in a web application related to the client application within a predetermined length of time before the current time, in order to determine whether the client application is allowed to send a relationship creating request to the server through the browser. Specifically, determination is made in advance whether a single sign on may be performed for logging into the client application in the terminal currently. A single sign on corresponds to directly performing a login operation of the client application according to the disclosed method without the need of the user to enter a user name and a password when the client application is needed to be logged in. Since the IP address of the terminal may change, the current IP address can be used to obtain a region (e.g., a province or a city) where the terminal is currently located in order to determine whether the current IP address of the terminal is consistent with a region associated with the IP address that has previously been obtained when the user successfully logged in the web application, i.e., whether a match exists for the IP address.

If no terminal that is consistent with the device type and the operation system type of the terminal and that matches the IP address of the terminal exists within the predetermined period of time, S205 will be performed.

At S205, the client application is notified to conduct a login operation using a user name and a password. In other words, the client application cannot perform a single sign on and needs the user to manually enter a user name and a password to perform the login operation. For example, the client application may display a login interface to the user and prompt the user to enter a user name and a password in corresponding fields on the login interface to perform the login.

If a terminal that is consistent with the device type and the operation system type of the terminal and matches the IP address of the terminal has successfully logged into a web application related to the client application within the predetermined period of time, this indicates that the user of the client application may have successfully logged in the web application program via the terminal. The client application may then be notified to send a relationship creating request, and S206 will be performed.

At S206, a relationship creating request sent by the browser is received, and a corresponding relationship between the device information of the terminal and the access token is created in accordance with the relationship creating request, wherein the relationship creating request includes the access token and the device information of the terminal.

At S207, an identification token is sent to the browser after the corresponding relationship between the device information of the terminal and the access token is created in accordance with the relationship creating request. The relationship creating request includes the access token, which indicates that the user has successfully logged into the web application using the browser of the terminal. Therefore, when a relationship creating request is received, a corresponding relationship between the device information of the terminal and the access token can be created in accordance with the relationship creating request. Further, an identification token may be sent to the browser and the client application may receive the identification token through the browser. If the client application receives the identification token, this indicates that the server has already created the corresponding relationship between the access token and the device information of the terminal, and the client application may perform a single sign on. The identification token may be generated randomly, e.g., the server may return a HTML that contains the identification token to the browser. The browser wakes up the client application upon receiving the HTML. The browser may wake up the client application by sending an Open URL to the client application. Further, the identification token may be sent to the browser from the server in advance. The browser places the identification token in the Open URL for waking the client application to be sent to the client application.

According to an embodiment of the present disclosure, in order to ensure the security of the login process, an effective time period for storing the corresponding relationship between the device information of the terminal and the access token can be configured. The corresponding relationship may be deleted or be set to be invalid after the effective time period is expired. The effective time period of the identification token can be configured, for example, as one minute, so that the identification token will be invalid after the effective time period of one minute is expired and the relationship creating request will be rejected.

At S208, a login request of a client application is received. The login request includes the device information of the terminal that operates the client application and may further include the identification token that has been sent to the browser by the server after the relationship creating request that is sent from the client application program via the browser is received by the server.

At S209, determination is made as to whether the identification token included in the received login request is valid. In other words, after receiving the login request from the client application, determination is made as to whether the identification token included in the received login request is a correct identification token, or whether the identification token is still within the effective time period. If the identification is invalid (e.g., the identification token is not a correct identification token or the effective time period of the identification token is expired), 5210 will be performed and the login request of the client application is rejected.

If the identification token is valid, the access token corresponding to the device information of the terminal that operates the client application is determined based on the created corresponding relationship between the device information and the access token at S211.

Specifically, the login request, which is sent by the client application and includes the device information of the terminal and the identification token, may be a request in a form of a URL, and thus may be called as a single sign on URL. The server verifies whether the identification token included in the received login request is valid, and rejects the login request if the identification token is invalid. The client application may encrypt and transmit the device information of the terminal and the identification token to the server. After decrypting, the server verifies whether the identification token is valid. The login request can be performed if the identification token is valid, i.e., the access token corresponding to the device information of the terminal may be determined based on the device information included in the login request, and the user information corresponding to the access token may further be determined, so as to perform the login operation of the client application based on the user information. Since the corresponding relationship between the device information and the access token has been created at S206 as described above, the access token corresponding to the device information of the terminal can be determined based on the created corresponding relationship.

At S212, the device information corresponding to the access token is determined based on the created corresponding relationship between the access token and the user information, and the login operation for the client application is performed based on the user information. Since the corresponding relationship between the access token and the user information of the user has already been created at S201, the user information corresponding to the access token which corresponds to the device information can be further determined based on the created corresponding relationship between the access token and the user information, and the client application can be logged in based on the user information.

According to an embodiment of the present disclosure, after the client application is successfully logged in, the corresponding relationship between the device information of the terminal and the access token may be deleted. In other words, the single sign on URL can be used only one time in order to ensure that the URL will not be used by any other client application or a client application of another terminal to perform the single sign on after the presently successful login operation, thus guaranteeing the security of the user information.

The present disclosure further provides a server implementing a login operation for a client application of a terminal.

Figure 3:
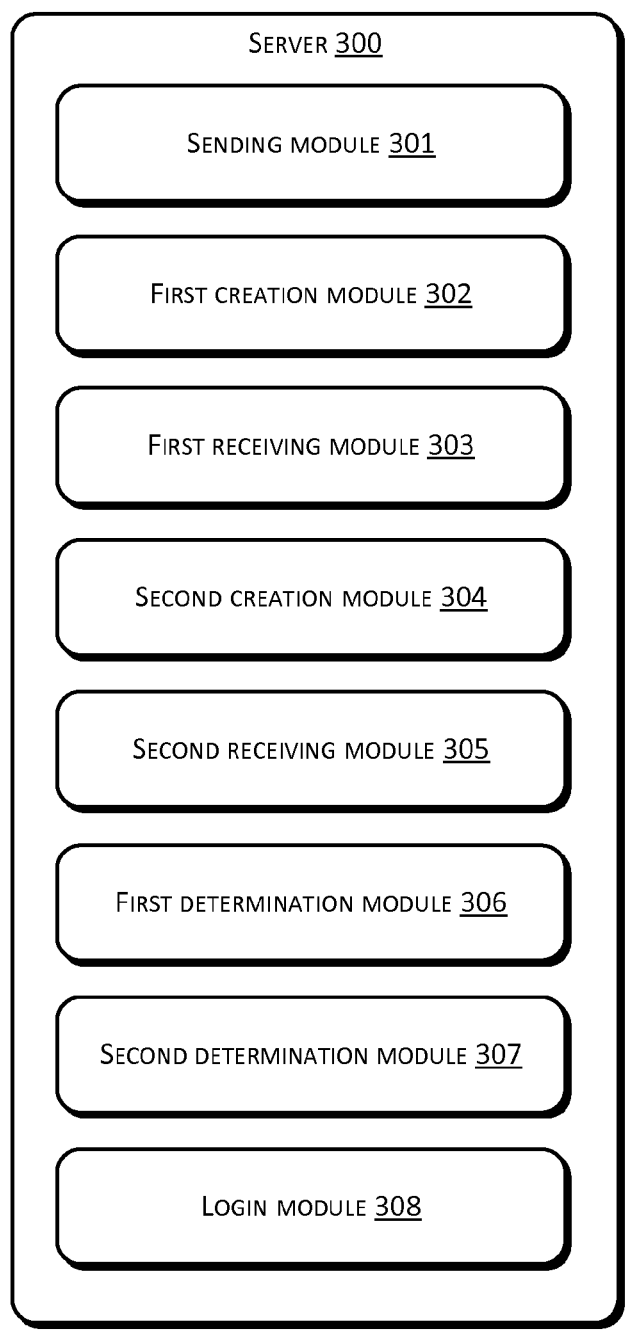
FIG. 3 is a structural diagram illustrating a server performing a login operation of a client application according to the present disclosure.

FIG. 3 is a structural block diagram illustrating a server that performs a login operation for a client application (app) of a terminal according to an embodiment of the present disclosure. According to an embodiment of the present disclosure, the server 300 may include: a sending module 301, a first creation module 302, a first receiving module 303, a second creation module 304, a second receiving module 305, a first determination module 306, a second determination module 307 and a login module 308.

The sending module 301 may be used for sending an access token to a browser of a terminal after a user has successfully logged into a web application via the browser of the terminal.

The first creation module 302 may be used for creating a corresponding relationship between the access token and the user information of the user.

The first receiving module 303 may be used for receiving a relationship creating request sent by the client application via the browser, wherein the request includes device information of the terminal and the access token.

The second creation module 304 may be used for creating a corresponding relationship between the device information of the terminal and the access token in accordance with the creating relationship request.

The second receiving module 305 may be used for receiving a login request of the client application, wherein the login request includes the device information of the terminal.

The first determination module 306 may be used for determining the access token corresponding to the device information of the terminal that operates the client application based on the created corresponding relationship between the device information and the access token.

The second determination module 307 may be used for determining the user information corresponding to the access token based on the created corresponding relationship between the access token and the user information.

The login module 308 may be used for obtaining the corresponding user information based on the device information of the terminal included in the login request, and performing a login operation for the client application based on the user information.

According to an embodiment of the present disclosure, the device information may comprise any one of the following: a unique identifier of the device or a physical address of the device.

According to an embodiment of the present disclosure, the login module 308 may include: a first determination sub-module, a second determination sub-module and a login execution sub-module.

Accordingly, the first determination sub-module may be used for determining the access token corresponding to the device information of the terminal included in the login request.

The second determination sub-module may be used for determining the user information corresponding to the access token that corresponds to the device information.

The login execution sub-module may be used for performing the login operation for the client application based on the user information.

According to an embodiment of the present disclosure, the server 300 may further include an acquisition module used for obtaining a current IP address of the terminal, a device type and an operating system type of the terminal after the user has successfully logged into the web application via the browser of the terminal.

According to an embodiment of the present disclosure, the server 300 may further include: a third receiving module, an IP address acquisition module, a query module and an information sending module.

The third receiving module may be used for receiving the device and the operation system type of the terminal from the client application.

The IP address acquisition module may be used for obtaining the current IP address of the terminal.

The query module may be used for querying whether a terminal that matches the device type, the operation system type and the IP address of the terminal has successfully logged in a web application related to the client application within a predetermined period of time.

The information sending module may be used for sending, to the client application, prompt information indicating that the client application of the terminal is unable to perform a single sign-on on the terminal when no terminal that matches the device type, the operation system type and the IP address of the terminal has successfully logged in the web application related to the client application within the predetermined period of time.

According to an embodiment of the present disclosure, the server 300 may further include an identification token sending module used for sending an identification token to the client application after the corresponding relationship between the device information of the terminal and the access token is created in accordance with the relationship creating request.

According to an embodiment of the present disclosure, the login request may further include the identification token. The server 300 may further include a determination module and a request rejection module. Accordingly, the determination module may be used for determining whether the identification token included in the received login request is valid. The request rejection module may be used for declining the login request of the client application when the identification token is determined to be invalid.

According to an embodiment of the present disclosure, the server 300 may further include a deletion module used for deleting the corresponding relationship between the device information of the terminal and the access token after the client application is successfully logged in.

Since the functionalities implemented by the server in this embodiment basically correspond to the method embodiments described in FIG. 1 and FIG. 2, the descriptions of the foregoing embodiments can be referred to for the details of the missing features and thus the missing features will not be redundantly described herein.

Figure 4:
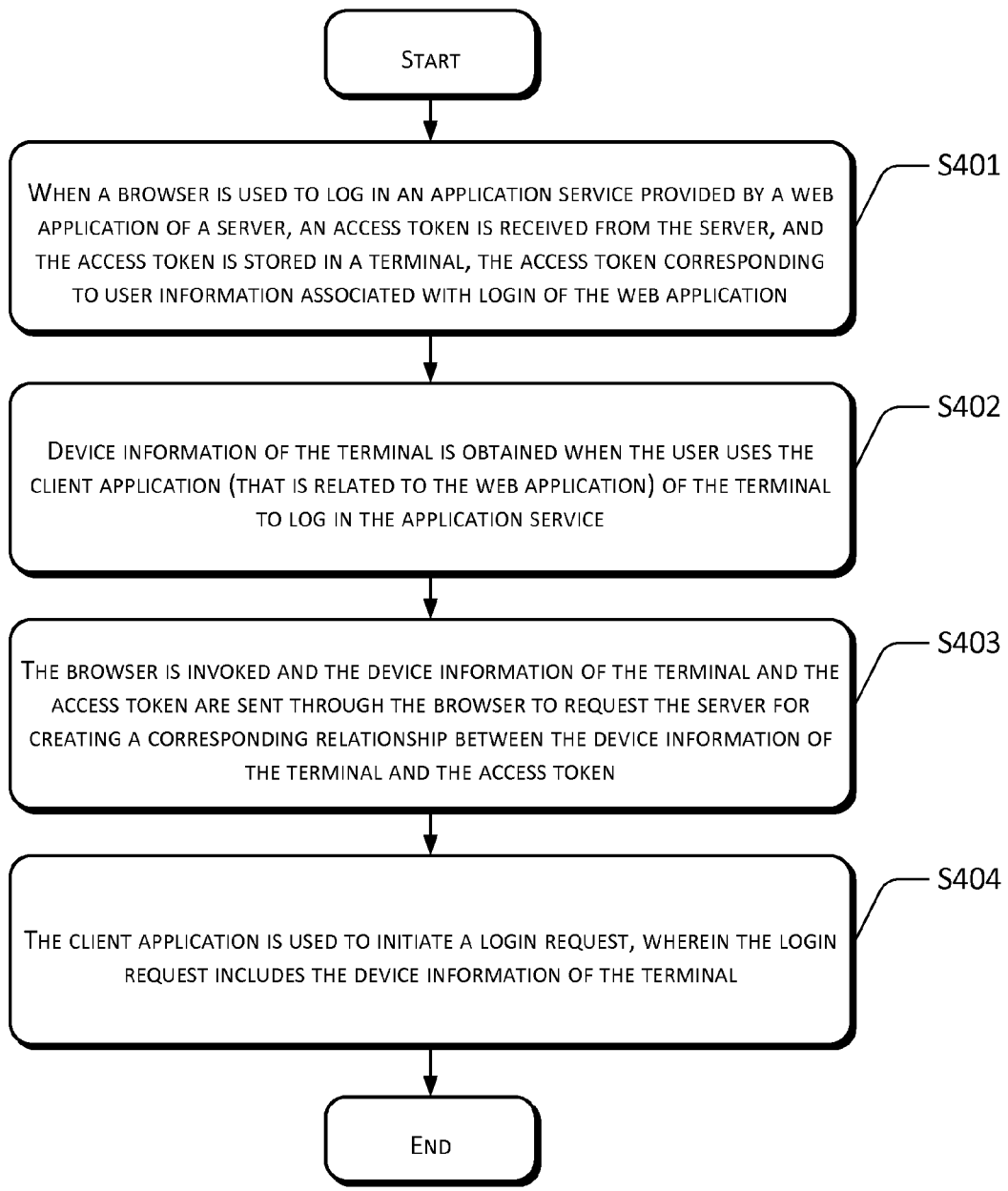
FIG. 4 is a flowchart illustrating a login method for a client application according to another aspect of the present disclosure.

According to another aspect of the present disclosure, a login method for a client application is provided. FIG. 4 is a flowchart illustrating a login method for a client application according to an embodiment of the present disclosure.

As shown in FIG. 4, at S401, when a browser is used to log in an application service provided by a web application of a server, an access token is received from the server, and the access token is stored in a terminal. The access token corresponds to user information associated with login of the web application.

Specifically, a server may randomly generate an access token after a user has successfully logged into a certain web application via a browser of a terminal, and send the access token to the browser. The access token may be placed within a cookie that is generated by the server and sent to the browser. Furthermore, a corresponding relationship between the access token and user information of the user can be created. The browser may store the access token that is returned from the server.

At S402, device information of the terminal is obtained when the user uses the client application (that is related to the web application) of the terminal to log in the application service.

Specifically, if a user further wants to log into a client application that is related to a web application after he/she has successfully logged into the web application using a browser of a terminal, the client application may obtain device information of the terminal when the client application is opened by the user. The device information may comprise any one of the following: a unique identifier of the device or a physical address of the device. For example, a physical address, i.e., MAC address, of the terminal may be obtained.

At S403, the browser is invoked and the device information of the terminal and the access token are sent through the browser to request the server for creating a corresponding relationship between the device information of the terminal and the access token.

In other words, the client application may invoke the browser of the terminal, and send the obtained device information of the terminal and the access token to the server in a form of an http request parameter using the browser, so as to request the server for creating a corresponding relationship between the device information and the access token. Upon receiving the relationship creating request, the server may create the corresponding relationship between the device information of the terminal and the access token in accordance with the request for creating the relationship.

According to an embodiment of the present disclosure, before the relationship creating request that includes the device information of the terminal and the access token is sent to the server through the browser, a device type and an operation system type of the terminal may be sent to the server to enable the server to determine whether the client application may be allowed to perform a single sign on operation in the terminal. In addition, prompt information may be received from the server, indicating whether the client application is allowed to perform the single sign on operation in the terminal.

Specifically, the device type and the operation system type may be sent to the server in advance when the client application is to be logged in. When the user has successfully logged into a web application that is associated with the client application, the server may obtain a current IP address of the terminal, and resolve the terminal's device type (such as resolving whether the terminal is a mobile terminal or other type of terminal) and operation system type (i.e., which type of operation system to which the terminal belongs). According to the http transmission protocol, a browser typically sends user agent information while visiting a webpage. Under normal circumstances, the user agent information includes information of an operation system that runs the browser, i.e. type information of the operating system of the terminal. Therefore, the device type and the operation system type can be resolved from the user agent information carried in the http request. Since the current IP address, the device type and the operation system type of the terminal have been obtained when the user successfully logs into a web page using the browser, the server can obtain the current IP address of the terminal when receiving the device type and the operation system type of the terminal from the client application, and determine whether a terminal that is consistent with the device type and the operation system type of the terminal and matches the current IP address of the terminal has successfully logged in a web application related to the client application within a predetermined period of time (which is a predetermined length of time prior to the current time. Specifically, determination is made as to whether a terminal that is consistent with the device type and the operation system type of the terminal has successfully logged in a web application related to the client application, with an IP address used during the associated login being the same as the IP address of the terminal or corresponding to a same area as the IP address of the terminal within a predetermined period of time, so that the server may determine whether the client application is allowed to send a relationship creating request to the server, and confirm whether the client application is allowed to send the relationship creating request to the server. Specifically, determination is made in advance whether a single sign on may be performed for the terminal to log into the client application in the terminal currently. A single sign on corresponds to directly performing a login operation of the client application according to the disclosed method without the need of the user to enter a user name and a password when the client application is needed to be logged in.

If no terminal that is consistent with the device type and the operation system type of the terminal and matches the IP address of the terminal has successfully logged into a web application that is related to the client application within the predetermined period of time, notification indicating that a user name and a password is to be used for login is received from the server. In other words, the user needs to manually enter a user name and a password to perform a login operation. For example, the terminal may display a login interface and prompt the user to enter a user name and a password in respective fields on the login interface to log into the client application.

If a terminal that is consistent with the device type and the operation system type of the terminal and matches the IP address of the terminal has successfully logged into a web application related to the client application within the predetermined period of time, notification which indicates a permission of sending a relationship creating request is received from the server. A relationship creating request may then be sent to the server. The relationship creating request includes the device information of the terminal and the access token to request the server for creating a corresponding relationship between the device information of the terminal and the access token.

According to an embodiment of the present disclosure, an identification token that is sent from the server may be obtained from the browser. The identification token is sent to the browser by the server after the server receives the relationship request and creates the corresponding relationship between the device information of the terminal and the access token in accordance with the received relationship creating request, to indicate that the client application may perform a single sign on operation in the terminal.

Specifically, the server receives the relationship creating request. Since the relationship creating request includes the access token, which indicates that the user has successfully logged into the web application via the browser of the terminal, the server may further send an identification token to indicate that the client application is allowed to perform a single sign on operation in the terminal after a corresponding relationship between the device information of the terminal and the access token is created in accordance with the relationship creating request. The server may generate the identification token randomly. The client application may obtain the identification token through the browser. If the client application obtains the identification token from the browser, this indicates that the client application can perform the single sign on operation in the terminal. For example, the server may return HTML that contains the identification token to the browser. The browser wakes up the client application upon receiving the HTML. The browser may wake up the client application by sending an Open URL to the client application. Furthermore, the browser may place the identification token in the Open URL which is used for waking up the client application for sending to the client application. The client application may obtain the identification token from the Open URL sent by the browser. If the client application obtains the identification token that is sent by the server from the browser, this indicates that the client application can perform the single sign on operation in the terminal and S403 is performed.

At S404, the client application is used to initiate a login request, wherein the login request includes the device information of the terminal. The login request is used for requesting the server to determine the access token corresponding to the device information of the terminal based on the created corresponding relationship between the device information of the terminal and the access token, to determine the user information corresponding to the access token based on the corresponding relationship between the access token and the user information, and to perform a login operation using the determined user information.

According to an embodiment of the present disclosure, the login request may further include the identification token.

Specifically, if the identification token that is sent by the server can be obtained from the browser of the terminal, the client application may perform the single sign on operation in the terminal and may send a login request that includes the device information of the terminal to the server. The login request may further include the identification token. After receiving the login request, the server may first determine whether the identification token included in the received login request is valid (i.e., determining whether the identification token included in the received login request is a correct identification token or whether the identification token is expired). The server rejects the login request of the client application if the identification token is invalid. If the identification token is valid, the server determines the access token corresponding to the device information of the terminal based on the device information of the terminal included in the login request and the corresponding relationship between the access token and the device information of the terminal that has been created in advance. Moreover, the server further determines the user information corresponding to the access token based on the corresponding relationship between the access token and the user information of the user, and performs a login operation for the client application based on the user information. This is the process of performing the single sign on operation for the client application in the terminal.

According to an embodiment of the present disclosure, the login request that is sent by the client application and includes the device information of the terminal and the identification token may be a request in form of URL, which is called as a single sign on URL. Furthermore, the client application may encrypt the device information of the terminal and the identification token to be transmitted to the server. After decryption, the server verifies whether the identification token is valid.

In a typical configuration, a computing device includes one or more processors (CPU), an input/output interface, a network interface and memory.

Figure 5:
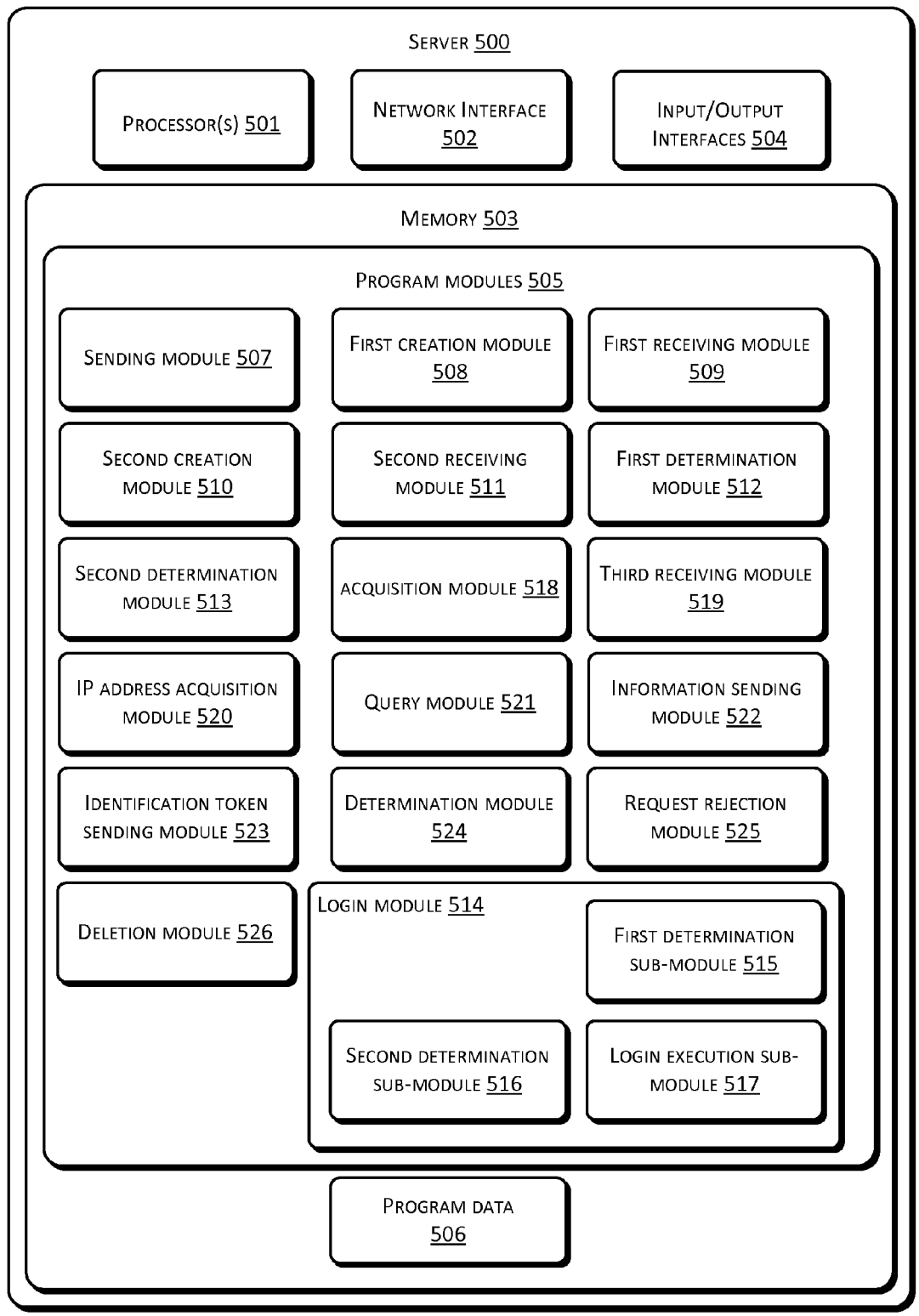
FIG. 5 is a structural diagram illustrating the server described in FIG. 3 in further details.

FIG. 5 shows an example server 500, such as the server as described above, in more detail. In an embodiment, the server 500 may include, but is not limited to, one or more processors 501, a network interface 502, memory 503 and an input/output interface 504.

The memory 503 may include a form of computer readable media, e.g., a non-permanent storage device, random-access memory (RAM) and/or a nonvolatile internal storage, such as read-only memory (ROM) or flash RAM. The memory 503 is an example of computer readable media.

The computer readable media may include a permanent or non-permanent type, a removable or non-removable media, which may achieve storage of information using any method or technology. The information may include a computer-readable command, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

The memory 503 may include program modules 505 and program data 506. In one embodiment, the program modules 505 may include a sending module 507, a first creation module 508, a first receiving module 509, a second creation module 510, a second receiving module 511, a first determination module 512, a second determination module 513, a login module 514, a first determination sub-module 515, a second determination sub-module 516, a login execution sub-module 517, an acquisition module 518, a third receiving module 519, an IP address acquisition module 520, a query module 521, an information sending module 522, an identification token sending module 523, a determination module 524, a request rejection module 525 and/or a deletion module 526. Details of these modules and sub-modules may be found in the foregoing description and are not redundantly described herein.

It should be noted that the terms "comprise", "include" or any other variations thereof are meant to cover the non-exclusive inclusions. The process, method, product or apparatus that includes a series of elements not only includes those elements, but also includes other elements that are not explicitly listed, or further includes elements that already existed in such process, method, product or apparatus. In a condition without further limitations, an element defined by the phrase "include one . . . " does not exclude any other similar elements from existing in the process, method, product or apparatus.

A person with ordinary skill in the art should understand that the embodiments of the present disclosure can be provided as a method, a system or a product of a computer program. Therefore, the present disclosure can be implemented as an embodiment of only hardware, an embodiment of only software or an embodiment of a combination of hardware and software. Moreover, the present disclosure can be implemented as a product of a computer program that can be stored in one or more computer readable storage media (which includes but is not limited to, a magnetic disk, a CD-ROM or an optical disk, etc.) that store computer-executable instructions.

The above merely describes the embodiments of the present disclosure, which are not intended to limit the scope of the present disclosure. Various modifications and alternations can be made to the present disclosure by a person with ordinary skill in the art. Any modifications, replacements and improvements within the scope of the spirit and principle of the present disclosure should fall within the scope of the claims of the present disclosure.

What is claimed is:

1. A method comprising:
   sending an access token to a browser of a terminal and creating a corresponding relationship between the access token and user information of a user after the user has successfully logged into a web application via the browser of the terminal;
   receiving a relationship creating request from a client application via the browser and creating a corresponding relationship between device information of the terminal and the access token in accordance with the relationship creating request, the client application being a third-party application different from the web application and the browser, wherein the relationship creating request includes the device information of the terminal and the access token, and wherein the access token is obtainable by the browser and not invokable by the client application;

receiving a login request of the client application, the login request including the device information of the terminal that operates the client application;

determining the access token corresponding to the device information of the terminal that operates the client application based on the created corresponding relationship between the device information and the access token;

determining the user information which corresponds to the access token based at least in part on the created corresponding relationship between the access token and the user information; and performing a login operation of the client application based at least in part on the user information.

2. The method as recited in claim 1, further comprising obtaining a current IP address, a device type and an operating system type of the terminal after the user has successfully logged into the web application via the browser of the terminal.

3. The method as recited in claim 2, further comprising:
receiving the device type and the operation system type of the terminal from the client application and obtaining the current IP address of the terminal;
querying whether a terminal that is consistent with the device type and the operation system type of the terminal and matches the IP address of the terminal has successfully logged into a particular web application related to the client application within a predetermined period of time; and
in response to a negative result of the querying, notifying the client application to log in using a user name and a password.

4. The method as recited in claim 1, further comprising sending an identification token to the browser after the corresponding relationship between the device information of the terminal and the access token is created in accordance with the relationship creating request.

5. The method as recited in claim 4, wherein the login request further includes the identification token.

6. The method as recited in claim 5, further comprising:
determining whether the identification token included in the received login request is valid after receiving the login request of the client application; and
rejecting the login request of the client application upon determining that the identification token is invalid.

7. The method as recited in claim 1, further comprising deleting the corresponding relationship between the device information of the terminal and the access token after the client application is successfully logged in.

8. The method as recited in claim 1, wherein the device information comprises one of a unique identifier of the terminal and a physical address of the terminal.

9. A server comprising:
one or more processors;
memory;
a sending module stored in the memory and executable by the one or more processors to send an access token to a browser of a terminal when a user has successfully logged into a web application via the browser of the terminal;

a first creation module stored in the memory and executable by the one or more processors to create a corresponding relationship between the access token and user information of the user;

a first receiving module stored in the memory and executable by the one or more processors to receive a relationship creating request from a client application via the browser, the client application being a third-party application different from the web application and the browser, wherein the relationship creating request includes device information of the terminal and the access token, and wherein the access token is obtainable by the browser and not invokable by the client application;

a second creation module stored in the memory and executable by the one or more processors to create a corresponding relationship between the device information of the terminal and the access token in accordance with the creating relationship request;

a second receiving module stored in the memory and executable by the one or more processors to receive a login request of the client application, wherein the login request includes the device information of the terminal that operates the client application;

a first determination module stored in the memory and executable by the one or more processors to determine the access token corresponding to the device information of the terminal that operates the client application based at least in part on the created corresponding relationship between the device information and the access token;

a second determination module stored in the memory and executable by the one or more processors to determine the user information corresponding to the access token based at least in part on the created corresponding relationship between the access token and the user information; and a login module stored in the memory and executable by the one or more processors to obtain the corresponding user information based on the device information of the terminal included in the login request, and perform a login operation of the client application based on the user information.

10. The server as recited in claim 9, further comprising an acquisition module used for obtaining a current IP address, a device type and an operating system type of the terminal after the user has successfully logged into the web application via the browser of the terminal.

11. The server as recited in claim 10, further comprising:
a third receiving module used for receiving the device type and the operation system type of the terminal from the client application;
an IP address acquisition module used for obtaining the current IP address of the terminal;
a query module used for querying whether a terminal that matches the device type, the operation system type and the IP address of the terminal has successfully logged into a particular web application program related to the client application within a predetermined period of time; and
a notification module used for notifying the client application to log in with a user name and a password when no terminal that matches the device type, the operation system type and the IP address of the terminal has successfully logged into the web application program related to the client application within the predetermined period of time.

12. The server as recited in claim 9, further comprising an identification token sending module used for sending an identification token to the browser after the corresponding relationship between the device information of the terminal and the access token is created in accordance with the relationship creating request.

13. The server as recited in claim 12, wherein the login request further comprises the identification token.

14. The server as recited in claim 13, further comprising:
  a determination module used for determining whether the identification token included in the received login request is valid; and
  a request rejection module used for rejecting the login request from the client application upon determining that the identification token is invalid.

15. The server as recited in claim 9, further comprising a deletion module used for deleting the corresponding relationship between the device information of the terminal and the access token after the client application is successfully logged in.

16. The server as recited in claim 9, wherein the device information comprises one of: a unique identifier of the terminal or a physical address of the terminal.

17. A method comprising:
  receiving an access token from a server when a browser is used to log into an application service provided by a web application of the server, and storing the access token in a terminal, wherein the access token corresponds to user information for logging into the web application;
  obtaining device information of the terminal when a client application in the terminal that is related to the web application is used to log into the application service, the client application being a third-party application different from the web application and the browser;
  invoking the browser to send the device information of the terminal and the access token for requesting the server to create a corresponding relationship between the device information of the terminal and the access token, the access token being obtainable by the browser and not invokable by the client application;
  initiating a login request using the client application, wherein the login request includes the device information of the terminal, and the login request is used for requesting the server to determine the access token which corresponds to the device information of the terminal based on the created corresponding relationship between the device information of the terminal and the access token; and
  determining the user information corresponding to the access token based on the corresponding relationship between the access token and the user information, and performing a login operation using the determined user information.

18. The method as recited in claim 17, further comprising:
  sending a device type and an operation system type of the terminal to the server to allow the server to determine whether the client application is permitted to send a relationship creating request to the server; and
  receiving notification from the server indicating whether the client application is permitted to send the relationship creating request to the server.

19. The method as recited in claim 17, further comprising obtaining an identification token that is sent by the server from the browser, wherein the identification token is sent to the browser of the terminal from the server when the relationship creating request is received, and wherein the login request that is sent to the server further includes the identification token.

20. The method as recited in claim 17, wherein the device information comprises one of: a unique identifier of the terminal or a physical address of the terminal.

* * * * *